United States Patent
Simon et al.

(10) Patent No.: US 10,152,806 B2
(45) Date of Patent: Dec. 11, 2018

(54) METHOD AND COMPUTER PROGRAM PRODUCT FOR GENERATING AN ARTEFACT REDUCED VOXEL DATA RECORD

(71) Applicant: Universität Stuttgart, Stuttgart (DE)

(72) Inventors: Sven Simon, Ludwigsburg (DE);
Steffen Kieβ, Schorndorf (DE); Jürgen Hillebrand, Stuttgart-Vahingen (DE); Jajnabalkya Guhathakurta, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 72 days.

(21) Appl. No.: 15/183,189

(22) Filed: Jun. 15, 2016

(65) Prior Publication Data
US 2016/0371863 A1 Dec. 22, 2016

(30) Foreign Application Priority Data
Jun. 19, 2015 (DE) .......... 10 2015 007 934

(51) Int. Cl.
*G06K 9/00* (2006.01)
*G06T 11/00* (2006.01)

(52) U.S. Cl.
CPC ....... *G06T 11/006* (2013.01); *G06T 2211/424* (2013.01)

(58) Field of Classification Search
None
See application file for complete search history.

(56) References Cited

U.S. PATENT DOCUMENTS

| | | | |
|---|---|---|---|
| 7,102,144 B2* | 9/2006 | Matsuda | A61N 5/10 250/492.1 |
| 8,299,448 B2* | 10/2012 | Bert | A61N 5/103 250/396 R |
| 8,731,269 B2* | 5/2014 | Nakanishi | G06T 11/006 378/21 |
| 9,084,888 B2* | 7/2015 | Poulsen | A61N 5/1049 |
| 9,661,736 B2* | 5/2017 | O'Neal, III | H05H 13/02 |
| 2003/0043957 A1* | 3/2003 | Pelc | A61B 6/032 378/4 |

(Continued)

FOREIGN PATENT DOCUMENTS

DE 102005044407 A1 3/2007

OTHER PUBLICATIONS

Ballhausen, Hendrik, et al. "Post-processing sets of tilted CT volumes as a method for metal artifact reduction." Radiation Oncology 9.1 (2014): 114.*

(Continued)

*Primary Examiner* — Andrae S Allison
(74) *Attorney, Agent, or Firm* — Banner & Witcoff, Ltd.

(57) ABSTRACT

The present invention relates to a method and a computer program product for generating an artifact-reduced voxel data record of an object. The artifact-reduced voxel data record of the object is generated with the aid of a computed tomography scanner. In some aspects of the present disclosure, a first image data record and a second image data record is generated by acquiring computed tomography images of the object. In still other aspects of the present disclosure, the artifact-reduced voxel data record of the object is generated with the aid of an image data reconstruction algorithm.

17 Claims, 11 Drawing Sheets

(56) References Cited

U.S. PATENT DOCUMENTS

| | | | | |
|---|---|---|---|---|
| 2006/0020200 A1* | 1/2006 | Medow | ............... | A61B 6/032 600/425 |
| 2007/0083101 A1* | 4/2007 | Rietzel | ............... | A61B 6/032 600/407 |
| 2007/0276215 A1* | 11/2007 | Ziegler | ............... | G06T 11/006 600/407 |
| 2009/0074129 A1* | 3/2009 | Kohler | ............... | A61B 6/032 378/4 |

OTHER PUBLICATIONS

Buzug, Thorsten M., Computed Tomography, From Photon Statistics to Modem Cone-Beam CT, Algebraic and Statistical Reconsruction Methods, pp. 222-240, © 2008 Springer-Verlag Berlin Heidelberg, 21 pages.

* cited by examiner

FIG.10
a)
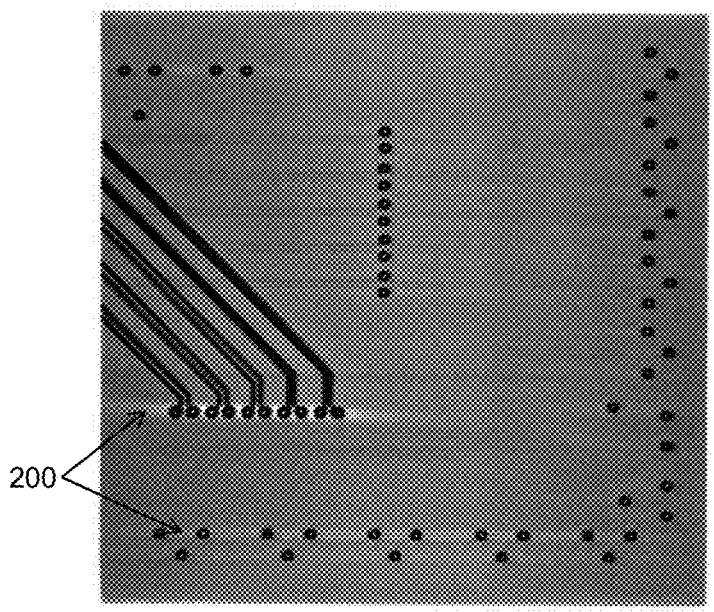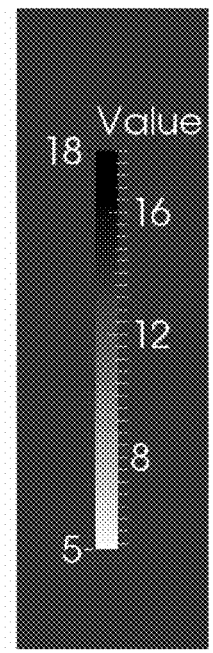
b)
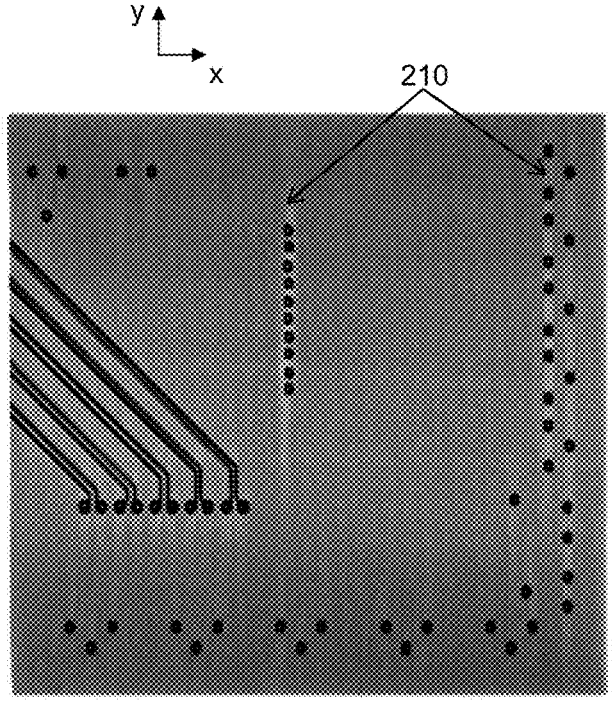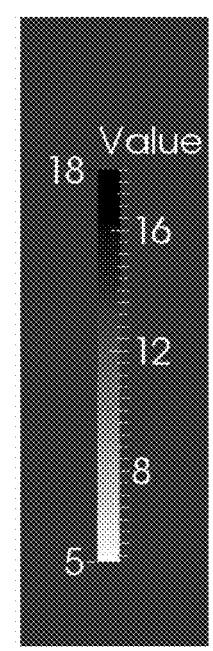

FIG. 11
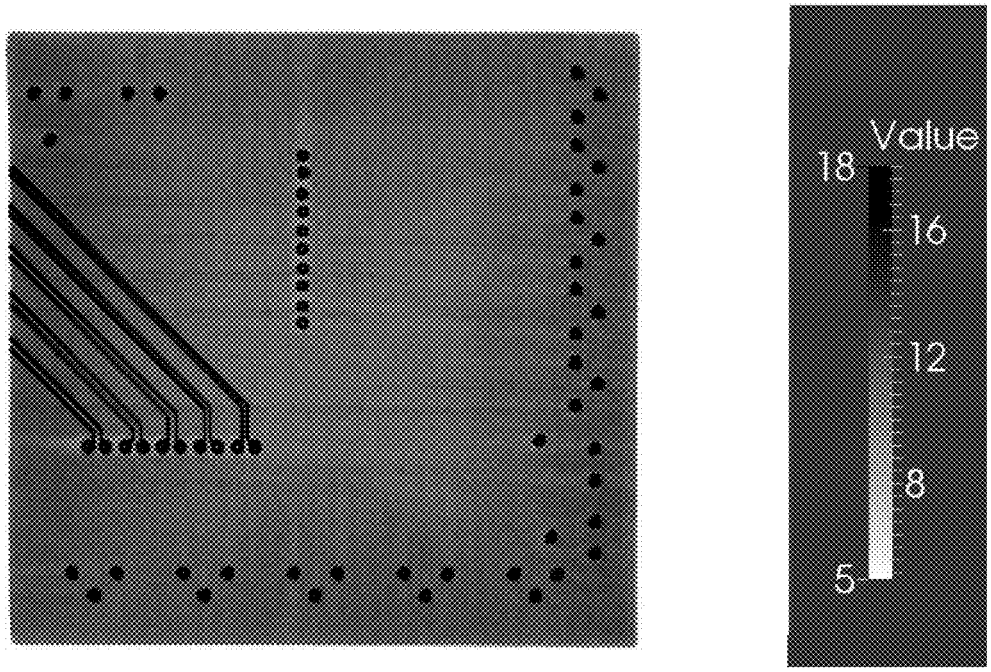
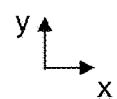

METHOD AND COMPUTER PROGRAM PRODUCT FOR GENERATING AN ARTEFACT REDUCED VOXEL DATA RECORD

RELATED APPLICATIONS

The present application is a U.S. non-provisional filing of German Patent Application No. 10 2015 007 934.4, filed on Jun. 19, 2015, and the present application claims priority to and the benefit of the above-identified application, which is incorporated by reference herein in its entirety.

BACKGROUND

The invention relates to a method for generating an artefact-reduced voxel data record of an object to be examined, with the aid of a computed tomography scanner and to a computer program product in this respect.

X-ray computed tomography (CT) is a method for obtaining information about the interior of objects. Computed tomography originates from the medical field but, in the meantime, it is also used in the industrial field for material analysis and for non-destructive examinations.

In x-ray computed tomography, artefacts arise as a result of various effects, e.g. as a result of the employed reconstruction method and as a result of beam hardening. The examination results can be influenced significantly by metallic artefacts, particularly in the case of industrial computed tomography, i.e. in the examination of technical objects such as e.g. printed circuit boards by way of computed tomography. Thus, metallic artefacts can cause e.g. streaks in the reconstructed data records and/or make the identification of structures which adjoin the metals more difficult or prevent the latter. Reconstruction and beam hardening artefacts also have a negative influence on the quality of x-ray computed tomography data records and can cause problems during further use of the data (e.g. in the case of edge detection algorithms).

Previous methods for reducing artefacts are either very time and computationally intensive or can only correct specific parts of the object to be examined, e.g. non-metallic parts.

It is therefore an object of the present invention to provide a method and a computer program product, by means of which artefacts, in particular reconstruction and beam hardening artefacts, can be reduced in computed tomography.

This object is achieved by the subject matter of the coordinate claims. Advantageous embodiments are the subject matter of the dependent claims.

A first independent aspect for achieving the object relates to a method for generating an artefact-reduced voxel data record of an object to be examined, with the aid of a computed tomography scanner, comprising the following steps in the specified sequence:
  generating a first image data record by acquiring a multiplicity of first computed tomography images of the object, wherein an acquisition angle in respect of a first axis of rotation is modified between the acquisition of the first computed tomography images;
  tilting the object by a predetermined tilt angle in respect of a second axis of rotation which is arranged substantially orthogonal to the first axis of rotation;
  generating a second image data record by acquiring a multiplicity of second computed tomography images of the object tilted about the second axis of rotation;
  generating the voxel data record of the object to be examined, with the aid of an iterative image data reconstruction algorithm which uses both the generated first image data record and the generated second image data record as an input data record.

Within the meaning of this description, a three-dimensional (3D) voxel data record or else volume data record is understood to mean a data record which comprises a multiplicity of voxels. Here, a voxel is a grid point or pixel in a three-dimensional grid or coordinate system. Hence, the multiplicity of voxels of the voxel data record represents the three-dimensional volume of the object to be examined, in the form of discrete points. The voxel data record comprises a value for each voxel, which value describes the attenuation of x-ray radiation at the location of the voxel, i.e. at a specific three-dimensional point of the object to be examined.

The term "acquisition" of images comprises, in particular, recording or measuring images.

A first image data record is generated by acquiring a multiplicity of first computed tomography images, i.e. a first series of images or a first image sequence, of the object. The images are acquired with the aid of an acquisition unit which comprises one or more detectors, e.g. a flat-panel detector. In particular, the first image data record comprises a multiplicity of first computed tomography images or a first series of images or a first image sequence. The individual images of the first image data record are in each case acquired from different perspectives, or acquisition or recording angles. To this end, an acquisition angle is modified in respect of a first axis of rotation of the object or of the computed tomography scanner between the acquisition of the first computed tomography images. By way of example, the object can be rotated about an axis of rotation between the acquisition of the individual images. Alternatively or additionally, an acquisition unit can be rotated about an axis of rotation between the acquisition of the individual images. In particular, each image of the first image data record can be associated with a specific perspective or a specific acquisition angle. Preferably, the first image data record comprises images for acquisition angles from 0° to 180°, more preferably from 0° to 360°.

Accordingly, a second image data record is generated by acquiring a multiplicity of second computed tomography images, i.e. a second series of images or a second image sequence, of the object. The images are acquired with the aid of an acquisition unit which comprises one or more detectors, e.g. a flat-panel detector. In particular, the second image data record comprises a multiplicity of second computed tomography images or a second series of images or a second image sequence. Just like the images of the first image data record, the individual images of the second image data record are in each case acquired from different perspectives, or acquisition or recording angles. To this end, the acquisition angle is modified in respect of the first axis of rotation of the object or of the computed tomography scanner between the acquisition of the second computed tomography images. By way of example, the object can be rotated about an axis of rotation between the acquisition of the individual images. Alternatively or additionally, an acquisition unit can be rotated about an axis of rotation between the acquisition of the individual images. In particular, each image of the second image data record can be associated with a specific perspective or a specific acquisition angle. Preferably, the second image data record comprises images for acquisition angles from 0° to 180°, more preferably from 0° to 360°.

Between the acquisition of the first computed tomography images and the acquisition of the second computed tomography images, the object is tilted by a predetermined or prescribed tilt angle in respect of a second axis of rotation. The second axis of rotation is oriented substantially orthogonal to the first axis of rotation. Preferably, the second axis of rotation corresponds to an optical axis of the computed tomography scanner, wherein the optical axis is defined e.g. by the connecting line between an x-ray source and the detector of the computed tomography scanner. In principle, the tilt angle can assume any value greater than 0° and less than 360°. By way of example, the tilt angle is approximately 30°, 60° or 120°. Preferably, the tilt angle is approximately 90°.

Furthermore, the first and/or second image data record preferably comprises metadata for each acquired image, which metadata describe the position and/or the perspective or the acquisition angle of the object.

Both the first image data record and the second image data record form the input data record for an iterative image data reconstruction algorithm, by means of which the artefact-reduced voxel data record of the object to be examined is generated or calculated.

It is also possible that, in addition to the first image data record and second image data record, one or more further image data records, e.g. a third, fourth, fifth, etc. image data record, is/are generated in a manner analogous to the first image data record and second image data record, wherein the object is tilted in relation to the second axis of rotation, in particular by the predetermined tilt angle or by a different predetermined tilt angle, between the acquisition of the images associated with the respective image data records in each case.

In the method according to the invention, a plurality of x-ray data records are advantageously combined during the reconstruction in order to reduce the artefacts and in order to improve the accuracy of values which are obtained from the voxel data. It was found that artefacts such as reconstruction and beam hardening artefacts generally have a directional dependence and, in particular, extend away from the structures in the voxel data record in a manner orthogonal to the employed axis of rotation.

As a result of two image data records of the object being generated or recorded in the method according to the invention, said image data records differing in that the object is tilted or rotated orthogonally in relation to the first axis of rotation, in particular by 90 degrees, between the recording of the first image data record and of the second image data record, the arising artefacts extend in different directions. The iterative image data reconstruction algorithm simultaneously uses both data records of the same object in different orientations as input and, as a result, supplies a voxel data record with significantly reduced artefacts.

In a preferred embodiment of the method according to the invention, the iterative image data reconstruction algorithm is based on a maximum likelihood expectation maximization (MLEM) algorithm.

In particular, the iterative image data reconstruction algorithm is a modified MLEM algorithm which is designed to use or process a plurality of different image data records, in particular two image data records, of the object simultaneously as an input or as an input data record. An artefact-reduced voxel data record can be calculated iteratively on the basis of the two image data records or on the basis of the plurality of image data records by means of the modified MLEM algorithm.

In a further preferred embodiment of the method according to the invention, the image data reconstruction algorithm comprises a calculation of a normalization volume data record, wherein the normalization volume data record emerges as a sum of a normalization volume data record associated with the first image data record and a normalization volume data record associated with the second image data record.

Expressed in formulae, the normalization volume data record norm is calculated as follows:

$$\text{norm} = P_{rot1}^T(\text{normseq}_1) + P_{rot2}^T(\text{normseq}_2) \quad (1),$$

where
$P_{rot}^T(I)$ generally represents a transposed projection or a back projection of an image sequence I, which is rotated by the inverted quaternion rot. The index 1 in Equation (1) in this case means that the back projection relates to first image data record, while the index 2 accordingly means that the back projection relates to the second image data record. In particular, rot1 is a quaternion which describes the rotation of the object for the first image data record, with rot1 therefore being an identical rotation, i.e. rot1:=1. Accordingly, rot2 is a quaternion which describes the rotation of the object for the second image data record. To the extent that the tilt of the object between the acquisition of the images of the first image data record and the acquisition of the images of the second image data record is 90° about the z-axis, the following applies:

$$\text{rot2} = \frac{1}{\sqrt{2}} + k\frac{1}{\sqrt{2}}.$$

normseq$_1$ means a normalized image sequence of the first image data record and normseq2 means a normalized image sequence of the second image data record.
In particular, $$\text{normseq}_1 := 1 \text{ and } \text{normseq}_2 := 1 \quad (2)$$

are set in Equation (1).

In a further preferred embodiment of the method according to the invention, the image data reconstruction algorithm comprises a calculation of a projection associated with the first image data record and a projection associated with the second image data record. In particular, the calculation of the projection associated with the second image data record comprises a coordinate transform on the basis of the orientation of the tilted object.

Expressed in formulae, a projection $$\text{proj}_1 := P_{rot1}(\text{vol}_n) \quad (3)$$

belonging to the first image data record and a projection $$\text{proj}_2 := P_{rot2}(\text{vol}_n) \quad (4)$$

belonging to the second image data record are calculated. Here, vol$_n$ means the volume data record in the nth iteration step.

In a further preferred embodiment of the method according to the invention, each pixel of the generated first image data record is divided by the corresponding pixel of the projection associated with the first image data record, as result of which a modulated projection $$\text{proj}_1^* := \frac{\text{input}_1}{\text{proj}_1}$$

associated with the first image data record is obtained. Furthermore, each pixel of the generated second image data record is divided by a corresponding pixel of the projection associated with the second image data record, as a result of which a modulated projection $$\text{proj}_2^* := \frac{\text{input}_2}{\text{proj}_2}$$

associated with the second image data record is obtained.

In a further preferred embodiment of the method according to the invention, a back projection, preferably an unfiltered back projection, is calculated on the basis of the modulated projection $\text{proj}_1^*$ associated with the first image data record and the modulated projection $\text{proj}_2^*$ associated with the second image data record.

In a further preferred embodiment of the method according to the invention, the back projection is calculated as a sum of a back projection, preferably an unfiltered back projection, associated with the first image data record and a back projection, preferably an unfiltered back projection, associated with the second image data record.

Expressed in formulae, this back projection is calculated as follows:

$$\text{backproj} := P_{rot1}^T(\text{proj}_1^*) + P_{rot2}(\text{proj}_2^*) \quad (5).$$

A further independent or alternative aspect for achieving the object relates to a method for generating an artefact-reduced 3D voxel data record of an object to be examined, with the aid of a computed tomography scanner, comprising the following steps in the specified sequence:
  generating a first image data record by acquiring a multiplicity of first computed tomography images of the object, wherein an acquisition angle in respect of a first axis of rotation is modified between the acquisition of the first computed tomography images;
  tilting the object by a predetermined tilt angle in respect of a second axis of rotation which is arranged substantially orthogonal to the first axis of rotation;
  generating a second image data record by acquiring a multiplicity of second computed tomography images of the object tilted about the second axis of rotation;
  reconstructing the first image data record in a first coordinate system;
  generating a second coordinate system by rotating the first coordinate system on the basis of the orientation of the tilted object;
  reconstructing the second image data record in the second coordinate system;
  generating the voxel data record of the object to be examined, by data fusion of the reconstructed image data records.

The explanations made above or below in respect of the embodiments of the first aspect also apply to the aforementioned further independent or alternative aspect and, in particular, to embodiments preferred in this respect. In particular, the explanations made above and below in respect of the embodiments of the respective other aspects in particular also apply to an independent aspect of the present invention and to embodiments preferred in this respect.

In accordance with the alternative aspect of the present invention, the reconstruction of the first image data record and of the second image data record respectively is carried out in a first coordinate system and a second coordinate system. Here, the second coordinate system emerges from the first coordinate system by rotating the first coordinate system on the basis of the orientation of the tilted object. In particular, the second coordinate system emerges by rotating the first coordinate system about the predetermined tilt angle. Thus, the rotation is carried out, in particular, in such a way that the orientation of the reconstructed object is substantially identical in respect of the first coordinate system and of the second coordinate system.

Within the meaning of this description, "data fusion" is understood to mean a combination of data, with the data fusion in particular comprising an evaluation.

Two reconstructed image data records, i.e. two resultant voxel data records or volumes, are inherently aligned by means of the method according to the invention. This makes the step of the data fusion easier since no adaptation of the image data records in respect of the object orientation is required anymore during the data fusion. The only difference between the values of the mutually corresponding voxels in the two resultant volumes is either noise or an artefact. As a result of a second coordinate system being generated by rotating the first coordinate system prior to the reconstruction of the second image data record according to the invention, wherein the second image data record is reconstructed in said second coordinate system, the method according to the invention is only accompanied by a single interpolation step. Since each interpolation step is time intensive in view of the voxel data record and, moreover, may be afflicted by errors, the method according to the invention is superior in terms of speed and quality over conventional methods, in which two or more interpolation steps are required.

In a preferred embodiment of the method according to the invention, the second coordinate system is obtained or calculated from the first coordinate system by means of the following transformation:

$$G_2(0,x_2,y_2,z_2) = \text{rot}_2 \times G_1(0,x_2,y_2,z_2) \times \text{rot}_2^* \quad (6).$$

Here $G_1$ denotes the first coordinate system, $G_2$ denotes the second coordinate system, $\text{rot}_2$ denotes a rotation quaternion and $\text{rot}_2^*$ denotes the rotation quaternion conjugate to $\text{rot}_2$.

The use of quaternions is simpler in handling compared to Eulerian angles and advantageously avoids the possibility of a gimbal lock.

In a further preferred embodiment of the method according to the invention, the reconstruction of the first image data record and/or the second image data record is based on a back projection, preferably a filtered back projection. In particular, the reconstruction of the first image data record and/or the second image data record is carried out by means of a modified back projection, preferably a filtered back projection.

However, in principle, it is also possible for the reconstruction alternatively to be based on an MLEM or for it to be carried out by means of an MLEM.

In a further preferred embodiment of the method according to the invention, the modified back projection comprises a rotation of voxel coordinates (x,y,z):

$$(0,x',y',z') := \text{rot}^* \cdot (ix+jy+kz) \cdot \text{rot} \quad (7),$$

where (x',y',z') denote coordinates of the rotated coordinate system. The multiplications are quaternion multiplications in each case and rot* is the conjugate quaternion of rot.

In a further preferred embodiment of the method according to the invention, the data fusion of the reconstructed image data records comprises an extremal value formation, i.e. a formation of a minimum or a formation of a maximum, of mutually corresponding voxels of the first reconstructed image data record and the second reconstructed image data record.

In other words, the smallest or largest intensity value of the two mutually corresponding voxels of the first reconstructed image data record and the second reconstructed image data record is used for the resultant or fused voxel data record:

$$\text{vol}_f(x,y,z) = \min\{\text{vol}_1(x,y,z), \text{vol}_2(x,y,z)\} \quad (8a),$$

or $$\text{vol}_f(x,y,z) = \max\{\text{vol}_1(x,y,z), \text{vol}_2(x,y,z)\} \quad (8b).$$

In general terms, the data fusion can be carried out by means of a function $f$ in a manner dependent on the reconstructed first image data record and the reconstructed second image data record:

$$\text{vol}_f(x,y,z) = f\{\text{vol}_1(x,y,z), \text{vol}_2(x,y,z)\} \quad (8c).$$

In addition to forming the minimum and forming the maximum, this function can also comprise other calculation operations, such as e.g. forming an average value. However, within the scope of the present invention, the extremal value formation, i.e. the formation of a minimum or a maximum, was surprisingly found to be particularly effective.

A further independent aspect for achieving the object relates to a computer program product which comprises machine-readable program code which, when loaded onto a computer, is suitable for executing the method according to the invention.

Below, individual embodiments for achieving the object are described in an exemplary manner on the basis of the figures. Here, the individual described embodiments in part have features which are not mandatory for carrying out the claimed subject matter, but which provide desired properties in specific cases of application. Thus, embodiments which do not have all features of the embodiments described below should be considered to be disclosed as falling under the described technical teaching. Furthermore, certain features are only mentioned in relation to individual embodiments described below in order to avoid unnecessary repetition. Therefore, reference is made to the fact that the individual embodiments should be considered not only on their own, but also in an overview. On the basis of this overview, a person skilled in the art will identify that individual embodiments can also be modified by including individual features or a plurality of features from other embodiments. Reference is made to the fact that a systematic combination of the individual embodiments with individual features or with a plurality of features, which are described in relation to other embodiments, may be desirable and expedient, and should therefore be contemplated and also be considered to be comprised by the description.

BRIEF DESCRIPTION OF THE DRAWINGS

These and other objects, features, aspects, and advantage of the present disclosure will become better understood with regard to the following description, claims, and drawings. The present disclosure is illustrated by way of example, and not limited by, the accompanying figures in which like numerals indicate similar elements. Moreover, a list of reference numerals and corresponding explanations are provided in Table I.

FIG. 10 shows photographic recordings of sectional images through physical x-ray CT recordings of the test object, wherein image a) and image b) differ by a 90° tilt of the object when acquiring the CT images; and FIG. 11 shows a photographic record of a sectional image through physical x-ray CT recordings of the test object from FIG. 10 with reduced artefacts after application of the method according to the invention.

DETAILED DESCRIPTION

In the following description, use is made of the following abbreviations, symbols and signs:

u and v denote the position of a pixel in a two-dimensional (2D) image;

a is an index which specifies an image in an image sequence;

x, y and z describe the position of a voxel in a volume or voxel data record;

n denotes the current iteration step;

input means an image sequence which was recorded by a computed tomography scanner and which is used as input data record for the MLEM;

input (u,v,a) describes an attenuation of x-ray radiation for the pixel (u,v) in the image a;

$\text{input}_1$ is the image sequence which is recorded for generating a first image data record; each image of this first image sequence shows the whole object under a specific acquisition angle, with the acquisition angle differing for various images in the first image sequence;

$\text{input}_2$ is the image sequence which is recorded for generating a second image data record; each image of this second image sequence shows the whole object under a specific acquisition angle, with the acquisition angle differing for various images in the second image sequence;

$\text{vol}_0$ denotes the initial result volume or the result volume at the outset;

$\text{vol}_n$ denotes the result volume after the nth iteration step;

normseq, proj and proj* denote temporary image sequences;

backproj and backprojnorm denote temporary volume or voxel data records;

norm is a normalization volume;

rot is a rotation in the form of a quaternion;

rot1 is a quaternion which describes the rotation of the object for the first image data record, with rot1 therefore being an identical rotation, i.e. rot1:=1, by definition;

rot2 is a quaternion which describes the rotation of the object for the second image data record; to the extent that the tilt of the object between the acquisition of the images of the first image data record and the acquisition of the images of the second image data record is 90° about the z-axis, the following applies:

$$\text{rot2} = \frac{1}{\sqrt{2}} + k\frac{1}{\sqrt{2}};$$

$P_{rot}(V)$ denotes an image sequence which is generated by a forward projection of the volume V, which is rotated by the quaternion rot $P_{rot}^T(I)$ denotes a volume which is generated by an unfiltered back projection of the image sequence I and the inverse rotation rot;

$P_{rot}^{TF}(I)$ denotes a volume which is generated by a filtered back projection of the image sequence I and the inverse rotation rot;

$R_{rot}(I)$ denotes a volume which is generated by a reconstruction of the image sequence I and the inverse rotation rot; to the extent that the filtered back projection is used as a reconstruction algorithm, the following applies: $R_{rot}(I) = P_{rot}^{TF}(I)$.

Figure 1:
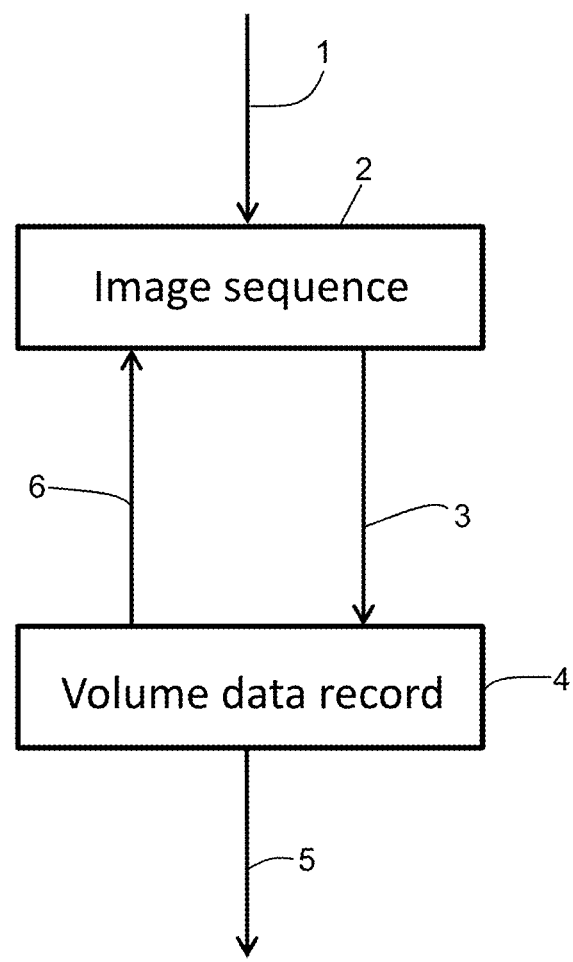
FIG. 1 shows a schematic flowchart for reconstructing CT images in accordance with the prior art.

FIG. 1 schematically shows the dataflow as conventionally takes place when reconstructing CT images. CT reconstruction is understood to mean the step characterized by reference sign in FIG. 1, in which a 3D voxel data record or a 3D volume data record 4 is generated on the basis of the raw images recorded by a computed tomography scanner. Finally, the 3D volume data record 4 describes the interior of the object to be examined.

As depicted in FIG. 1, a multiplicity of CT images are initially recorded under various perspectives or acquisition angles in a first step 1 using the computed tomography scanner. Here, a series of images or an image sequence 2 is created which forms the starting point for the reconstruction 3. The reconstruction step 4 can be essentially carried out using three different methods. The most commonly employed reconstruction methods are the so-called unfiltered and filtered back projection. Alternatively, use is also made of iterative methods which, although they are more time-consuming, provide a higher resolution of the generated volume data record. One of these iterative methods is the maximum likelihood expectation maximization (MLEM) algorithm. After the reconstruction step 4, the volume data can be processed further, prepared or evaluated in a further step 5.

Step 6 depicted in FIG. 1, the so-called projection, simulates the inverse process of the step 3. Thus, an image sequence 2 is calculated on the basis of a volume data record 4 during the projection. This step is required, in particular, for the MLEM. The unfiltered back projection is the transpose operation of the projection and it is used as part of the filtered back projection and as part of the MLEM.

The input data for the reconstruction process comprise an image sequence acquired by the detector of the computed tomography scanner, or a series of images, with the series typically comprising approximately 1800 images. Additionally, the input data also comprise metadata which describe the position and recording angle of the object for each image in the series. The results data of the reconstruction process comprise a voxel or volume data record which describes the attenuation of the x-ray radiation for each voxel of the object.

The methods of projection, of unfiltered back projection, of filtered back projection and of the MLEM algorithm, which are modified for the method according to the invention, are described in more detail below.

Projection:

The projection is a process in which an image sequence is calculated on the basis of a volume data record. Each image of the calculated image sequence shows the result of a simulated x-ray image for a specific geometry, i.e. for a specific acquisition angle, a specific object position and a specific distance between x-ray source and detector.

The projection proj=$P_{rot}$(vol) is calculated using the following steps i) to iii), with the calculation taking place for all images a of the image sequence and, in each image, for all pixels (u,v), where a∈{1, . . . , numImages}, with the number numImages of images in the series, and where (u,v)∈{1, . . . , numPixelU}×{1, . . . , numPixelV}, with the number numPixelU of pixels u and the number numPixelV of pixels v:

i) calculating the 3D coordinate point ($\det_x, \det_y, \det_z$), which corresponds to the detector pixel (u,v), using the geometry or the meta data of the image a;

ii) rotating the coordinates of the x-ray source (source) ($src_x, src_y, src_z$) and the coordinates of the detector ($\det_x, \det_y, \det_z$) in accordance with the inverse of rot:

$$(0, scr'_x, scr'_y, scr'_z) := \text{rot}^* \cdot (isrc_x + jsrc_y + ksrc_z) \cdot \text{rot} \quad (9),$$

$$(0, \det'_x, \det'_y, \det'_z) := \text{rot}^* \cdot (i\det_x + j\det_y + k\det_z) \cdot \text{rot} \quad (10),$$

where the multiplications are quaternion multiplications and rot* is the conjugate quaternion of rot.

iii) calculating the line integral from the position of the x-ray source ($src_x, src_y, src_z$) to the position of the detector ($\det_x, \det_y, \det_z$) by means of trilinear interpolation and storing the result for the current pixel:

$$\text{vec} := (\det'_x, \det'_y, \det'_z) - (scr'_x, scr'_y, scr'_z), \quad (11)$$

$$\text{dist} := |\text{vec}|, \quad (12)$$

$$\text{dir} := \frac{\text{vec}}{\text{dist}}, \quad (13)$$

$$\text{proj}(u, v, a) := \int_0^{\text{dist}} \text{vol}(src' + s \cdot \text{dir}) ds. \quad (14)$$

Unfiltered Back Projection:

The unfiltered back projection calculates a volume data record on the basis of an image sequence. This operation is therefore the transpose operation of the projection. The unfiltered back projection vol=$P_{rot}^T$(proj) is calculated on the basis of the following steps:

i) setting all voxels of the results data record vol to 0:

$$\text{vol}(x,y,z) := 0 \quad (15);$$

ii) carry out the following for all images a∈{1, . . . , numImages} and all voxels (x,y,z)∈{1, . . . , numVoxelX}×{1, . . . , numVoxelY}×{1, . . . , numVoxelZ} of the results volume:

a) calculate the point (u,v) on the detector, on which a line which passes through the x-ray source src and the point (x,y,z) is incident (i.e. calculate the point of intersection of the line with the detector plane); the geometry or the metadata of the image a are used for the calculation;

b) rotate the coordinates (x,y,z) in accordance with the inverse of rot, see also Equation (7):

$$(0,x',y',z'):=\text{rot}^* \cdot (ix+jy+kz)\cdot\text{rot} \quad (16),$$

where (x',y',z') represent coordinates of the rotated coordinate system. The multiplications are quaternion multiplications in each case and rot* is the conjugate quaternion of rot.

c) add the value at (u,v) to the current value of the results voxel using a bilinear interpolation, where the value of 0 is used to the extent that (u,v) lies outside of the input image:

$$\text{vol}(x',y',z'):=\text{vol}(x',y',z')+\text{proj}(u,v,a) \quad (17).$$

Filtered Back Projection:

The above-described unfiltered back projection is disadvantageous in that the resultant image is washed out and/or in that fine details are not identifiable. Hence, a filtered back projection is usually used in computed tomography, in which a digital filter, in particular a high-pass filter, is initially applied to the input data, before the unfiltered back projection, as described above, is carried out:

$$P_{rot}^{TF}(f):=P_{rot}^{T}(\text{HighPass}(f)) \quad (18).$$

Maximum Likelihood Expectation Maximization (MLEM):

An alternative to the filtered back projection lies in iterative methods, in which an initial estimate for the volume data record is improved iteratively. Such iterative solutions have the advantage of a lower noise and are therefore especially used in techniques such as positron emission tomography, in which the signal-to-noise ratio is very low. One iterative method is the MLEM. In MLEM, the problem of CT reconstruction is defined by means of a linear system of equations and solved iteratively:

$$A \cdot \text{vol} = \text{input} \quad (19),$$

where A represents a matrix which describes the projection operation, i.e. $A \cdot \text{vol} = P(\text{vol})$.

The individual steps during the conventional MLEM reconstruction are as follows:

i) calculating a normalization volume data record norm as an unfiltered back projection of an image sequence, wherein all pixels have a value of 1:

$$\text{normseq}(u,v,a):=1 \quad (20),$$

$$\text{norm}:=P^T(\text{normseq}) \quad (21);$$

ii) selecting an initial or inertial volume $\text{vol}_0$, wherein all voxels are normally set to a value of 1, and setting the current iteration index to 0:

$$\text{vol}_0(x,y,z):=1 \quad (22),$$

$$n:=0 \quad (23);$$

iii) calculating a projection of the current volume:

$$\text{proj}:=P(\text{vol}_n) \quad (24);$$

How the projection is calculated was already explained above in the section "Projection".

iv) dividing each pixel in the input image sequence input by the corresponding pixel in the image sequence proj of step iii):

$$\text{proj}^*(u,v,a):=\frac{\text{input}(u,v,a)}{\text{proj}(u,v,a)}; \quad (25)$$

v) calculating the unfiltered back projection of proj*:

$$\text{backproj}:=P^T(\text{proj}^*) \quad (26);$$

How the unfiltered back projection is calculated was already explained above in the section "Unfiltered Back Projection".

vi) dividing each voxel in backproj by the corresponding voxel in the normalization volume:

$$\text{backprojnorm}(x,y,z):=\frac{\text{backproj}(x,y,z)}{\text{norm}(x,y,z)}; \quad (27)$$

vii) setting each voxel of the results volume of the current iteration step as results voxel of the preceding iteration step multiplied by the corresponding voxel in backprojnorm:

$$\text{vol}_{n+1}(x,y,z)=\text{vol}_n(x,y,z)\cdot\text{backprojnorm}(x,y,z) \quad (28);$$

viii) increasing the iteration index of the current iteration:

$$n:=n+1 \quad (29);$$

ix) returning to step iii), provided n is less than the maximum number of iteration steps.

What was identified within the scope of the present invention is that the MLEM algorithm can also be used for reducing artefacts by virtue of the algorithm being modified in such a way that it simultaneously processes a plurality of image data records, in particular two image data records.

Hence, in accordance with the invention, a first image data record and a second image data record are recorded by way of the computed tomography scanner, with the second image data record differing from the first image data record by a tilt of the object. In the modified MLEM algorithm, all recorded images can be used and processed as input data. In other words, both the first and the second image data record are used for the reconstruction by means of the modified MLEM algorithm.

Figure 2:
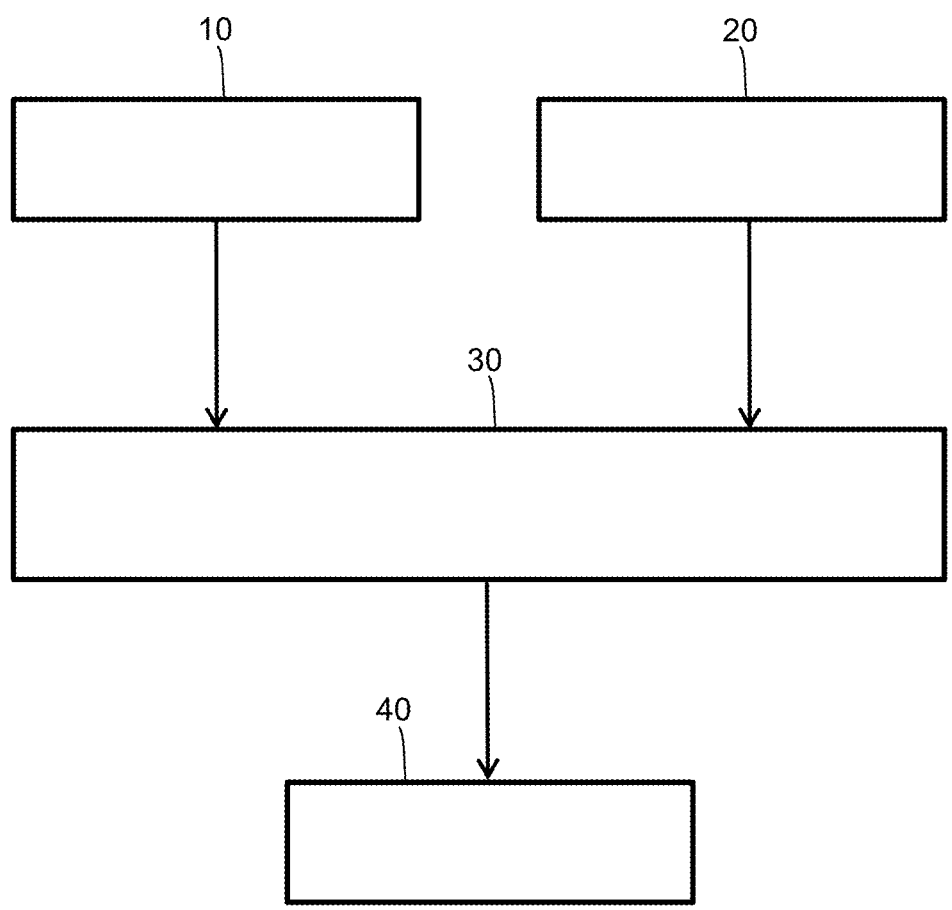
FIG. 2 shows a schematic flowchart of the method according to the invention in accordance with a preferred embodiment.

FIG. 2 shows a schematic flowchart of the method according to the invention in accordance with a preferred embodiment. To this end, a first image data record 10 is generated by virtue of a multiplicity of first computed tomography images of the object to be examined being acquired by means of a detector. Additionally, a second image data record 20 is generated after the object was tilted by a predetermined tilt angle, in particular by 90°. Finally, an artefact-reduced 3D voxel data record 40 of the object to be examined is calculated with the aid of an image data reconstruction algorithm 30 on the basis of the generated first image data record 10 and of the generated second image data record 20.

Thus, the object to be examined is scanned in the computed tomography scanner with two different, in particular orthogonal, orientations. The orientation of the 3-D object is advantageously described by means of quaternions which, compared to the Eulerian angle, are much easier to handle and moreover prevent the possibility of a "gimbal lock". A quaternion q encodes the object orientation in four numbers (a,b,c,d), of which a is the real part and (b,c,d) are the imaginary parts. The quaternion is given by:

$$q=a+ib+jc+kd \quad (30),$$

where $$i^2=j^2=k^2=ijk=-1 \quad (31).$$

A conversion from an axis-angle representation, comprising an axis vector (ax+by+cz) and an angle θ, into a quaternion representation is carried out as follows:

$$q = \cos\left(\frac{\theta}{2}\right) + ia\sin\left(\frac{\theta}{2}\right) + jb\sin\left(\frac{\theta}{2}\right) + kc\sin\left(\frac{\theta}{2}\right). \quad (32)$$

The basis orientation of an object, which represents no rotation, is given by the quaternion q=1. In this description, two orthogonal orientations are used, namely an orientation without rotation $rot_1$=1 and an orientation in which the object is rotated by 90° along the z-axis (0,0,1). The rotated orientation is given by the quaternion:

$$rot_2 = \cos(45°) + k\sin(45°) = \frac{1}{\sqrt{2}} + k\frac{1}{\sqrt{2}}. \quad (33)$$

For the purposes of reducing artefacts, CT recordings or CT scans of the object are carried out in these orthogonal orientations $rot_1$ and $rot_2$. Hence, two image data records of projection images $input_1$ and $input_2$ are obtained. The respective projection images are linked with the corresponding quaternion data in respect of the orientation in which the object was scanned.

Figure 3:
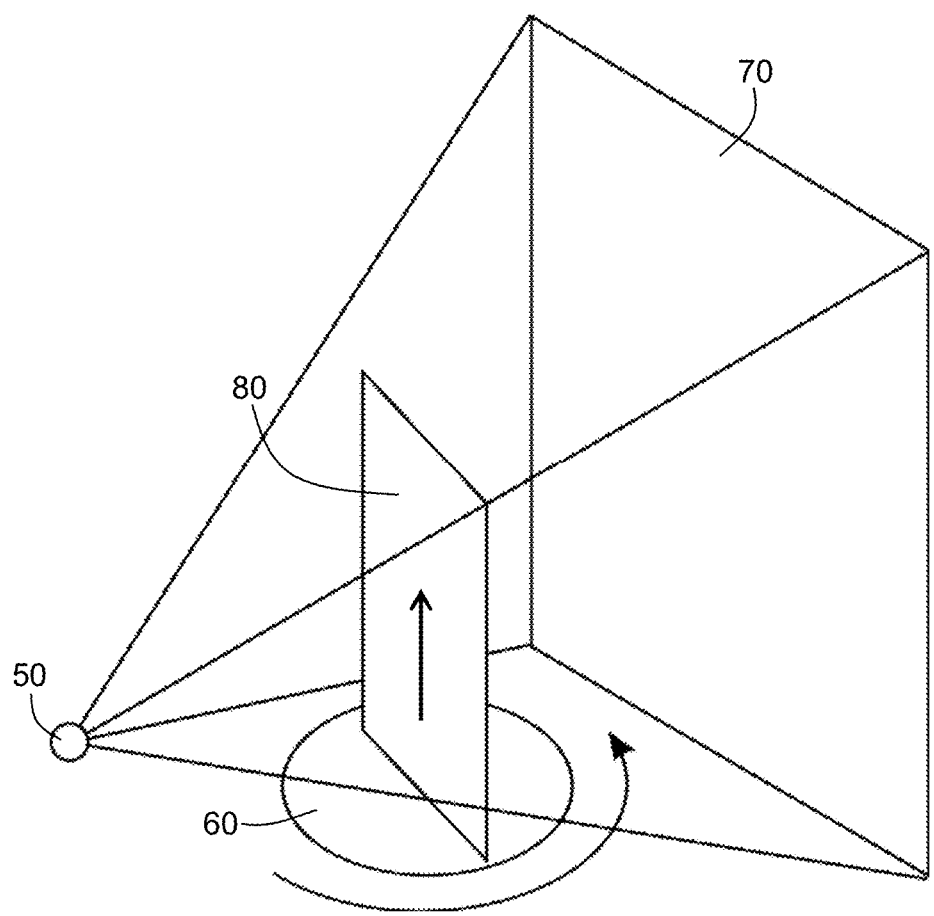
FIG. 3 shows a schematic sketch for acquiring a first image data record.

FIG. 3 shows a schematic sketch for acquiring the CT images of the first image data record, for which the object 80 to be examined is aligned in the first orientation $rot_1$. FIG. 3 shows a section of a computed tomography scanner with an x-ray source 50 and a detector 70. The object 80 to be examined, for example a printed circuit board, is situated on a rotatably mounted object support 60. The object support 60 is arranged between the x-ray source 50 and the detector 70 in such a way that the object support 60 with the object 80 is rotatable through 360° about a first axis of rotation. In FIG. 3, the first axis of rotation is oriented along the y-axis. For the purposes of generating the first image data record, the object is successively rotated about the first axis of rotation between the individually recorded images.

By way of example, the first image data record or the first image sequence can comprise 1800 images by virtue of the object respectively being rotated through 0.2° about the first axis of rotation after the acquisition of an image. In FIG. 3, the object 80 is arranged upright on the object support 60, i.e. a longitudinal axis of the object 80 indicated by the arrow is oriented along the first axis of rotation (y-direction).

Figure 4:
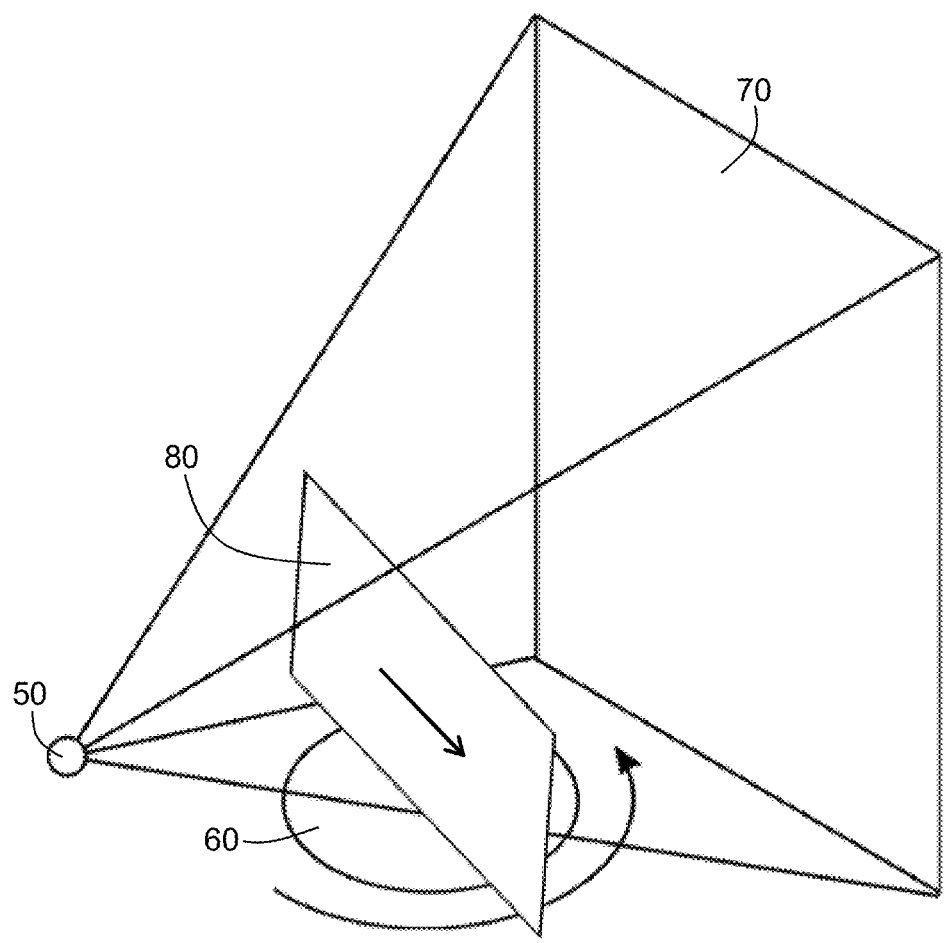
FIG. 4 shows a schematic sketch for acquiring a second image data record.

FIG. 4 shows a schematic sketch for acquiring the CT images of the second image data record, for which the object 80 to be examined is aligned in the second orientation $q_2$. In contrast to the generation of the first image data record, as depicted in FIG. 3, the object 80 was therefore tilted by 90° about a second axis of rotation. Here, the second axis of orientation is oriented in the z-direction, i.e. orthogonal to the first axis of rotation (y-direction). Analogous to the generation of the first image data record, the tilted object is successively rotated about the first axis of rotation between the individually recorded images for the purposes of generating the second image data record. By way of example, the second image data record or the second image sequence can also comprise 1800 images by virtue of the object in each case being rotated by 0.2° about the first axis of rotation after the acquisition of an image. In FIG. 4, the object 80 is arranged on its side on the object support 60, i.e. a longitudinal axis of the object 80 indicated by the arrow is oriented in the x-direction, i.e. orthogonal to the first axis of rotation and second axis of rotation.

After the first image sequence and second image sequence were recorded, the results, i.e. the corresponding image data records, must be reconstructed and unified. Below, two alternative options are described, namely a reconstruction of both image data records by means of a modified MLEM algorithm and a reconstruction by means of filtered back projection for the first image data record and the second image data record, and subsequent data fusion.

Reconstruction by Means of MLEM:

What was found within the scope of the present invention is that the MLEM algorithm, with the proviso that the above-described individual steps must be at least partly modified or extended, is suitable for the image data reconstruction algorithm 30 which can process both the first image data record and the second image data record to an artefact-reduced voxel data record in accordance with one aspect of the invention. In particular, the MLEM algorithm needs to be modified in such a way that both the first image data record and the second image data record can be used as input data for the algorithm.

The individual steps of a modified MLEM with artefact improvement are as follows:

i) calculating a normalization volume data record norm as unfiltered back projection of an image sequence, when all pixels have a value of 1:

$$normseq_1(u,v,a):=1 \quad (34),$$

$$normseq_2(u,v,a):=1 \quad (35),$$

$$norm:=P_{rot1}^T(normseq_1)+P_{rot2}^T(normseq_2) \quad (36).$$

Here, in Equations (34) to (36) above, the index 1 relates to the first image data record and the index 2 relates to the second image data record. Correspondingly, $normseq_1$ refers to a normalized image sequence of the first image data record and normseq2 refers to a normalized image sequence of the second image data record.

ii) selecting an initial or inertial volume $vol_0$, wherein all voxels are normally set to a value of 1, and setting the current iteration index to 0

$$vol_0(x,y,z):=1 \quad (37),$$

$$n:=0 \quad (38);$$

iii) calculating projections of the current volume, see also Formulae (3) and (4):

$$proj_1:=P_{rot1}(vol_n) \quad (39),$$

$$proj_2:=P_{rot2}(vol_n) \quad (40),$$

How the projections are calculated was already explained above in the section "Projection".

iv) dividing each pixel in the input image sequence input by the corresponding pixel in the image sequence proj of step iii):

$$proj_1^*(u, v, a) := \frac{input_1(u, v, a)}{proj_1(u, v, a)}, \quad (41)$$

$$proj_2^*(u, v, a) := \frac{input_2(u, v, a)}{proj_2(u, v, a)}; \quad (42)$$

v) calculating the unfiltered back projection of proj*; see Equation (5):

$$backproj:=P_{rot1}^T(proj_1^*)+P_{rot2}^T(proj_2^*) \quad (43);$$

How the unfiltered back projection is calculated was already explained above in the section "Unfiltered Back Projection".

vi) dividing each voxel in backproj by the corresponding voxel in the normalization volume:

$$backprojnorm(x, y, z) := \frac{backproj(x, y, z)}{norm(x, y, z)}; \qquad (44)$$

vii) setting each voxel of the results volume of the current iteration step as results voxel of the preceding iteration step multiplied by the corresponding voxel in backprojnorm:

$$vol_{n+1}(x,y,z) = vol_n(x,y,z) \cdot backprojnorm(x,y,z) \qquad (45);$$

viii) increasing the iteration index of the current iteration:

$$n := n+1 \qquad (46);$$

ix) returning to step iii), provided n is less than the maximum number of iteration steps.

Figure 5:
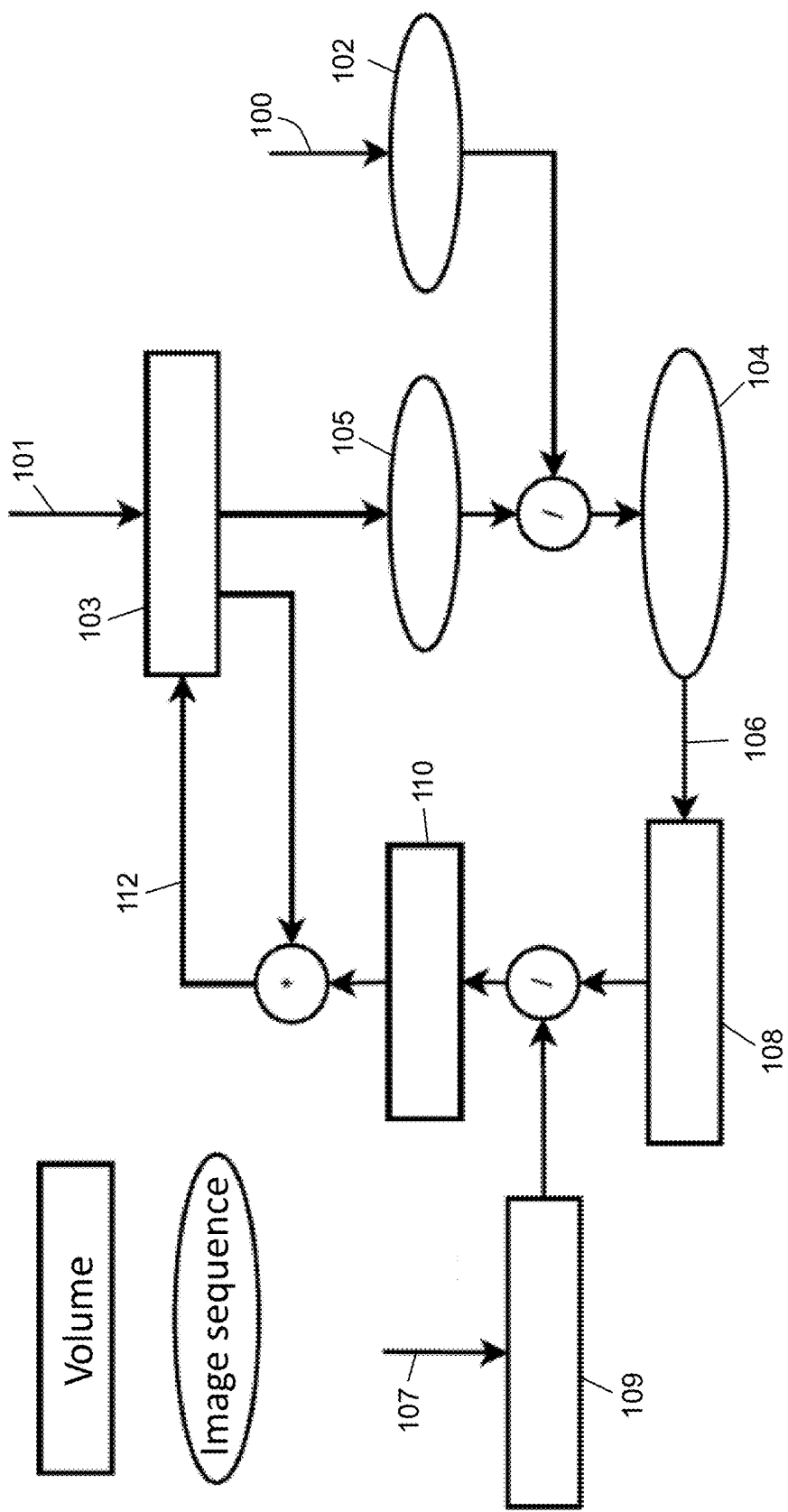
FIG. 5 shows a schematic flowchart of an image data reconstruction algorithm for the method according to the invention in accordance with a preferred embodiment.

FIG. 5 shows the MLEM image data reconstruction algorithm in accordance with a preferred embodiment on the basis of a schematic flow chart. Here, a volume or volume data record is denoted by a rectangle and an image sequence is denoted by an ellipse in each case. In step 100, the first image data record and the second image data record are provided as input data 102. In step 101, a first estimator (e.g. 1) is initially assumed in order to calculate an initial volume data record 103. Finally, this volume data record is iteratively adapted or improved. Projections 105 are calculated on the basis of the volume data records 103. The first input image data record and second input image data record 102 are divided by the result of these calculated projections 105 in each case, as a result of which an image sequence ratio 104 is obtained. Back projections 108 are calculated in step 106. The result of these back projections 108 is divided by a first normalization volume data record and a second normalization volume data record 109, respectively, which emerge from an unfiltered back projection 107, wherein a normalized volume data record 110 is obtained. Finally, in step 112, the output data are calculated for the next iteration step by virtue of the normalized volume data record 110 being multiplied by the volume data record 103 of the preceding iteration step. The result of this multiplication is the starting point for the next iteration step.

Reconstruction by Means of Filtered Back Projection and Subsequent Data Fusion:

Filtered Back Projection:

The first image data record and the second image data record, i.e. the projection data records $input_1$ and $input_2$, are reconstructed by a modified filtered back projection. The modification consists of the coordinate system in which the object is reconstructed being rotated in accordance with the object orientation prior to the actual back projection.

For the first image data record or the projection data record $input_1$, the coordinate system, in which a filtered back projection is carried out, is not rotated and represented by a first coordinate system or basis coordinate system $G_1$.

For the second image data record or the projection data record $input_2$, the associated coordinate system, in which a filtered back projection should be carried out, is rotated equivalently to, or on the basis of, the object orientation $rot_2$, i.e. on the basis of the orientation of the tilted object, prior to carrying out the filtered back projection. The angle about which the coordinate system is rotated thus corresponds to the tilt angle about which the object was tilted in order to generate the second image data record. A rotation (rot) of the first coordinate system $G_1$ into a second coordinate system $G_2$, in which finally the second image data record is reconstructed, can easily be carried out by pre-multiplication of each coordinate of the first coordinate system by the rotation quaternion (rot) and post-multiplication by the conjugate quaternion (rot*); see also Equation (6):

$$G_2(0,x_2,y_2,z_2) = rot_2 \times G_1(0,x_1,y_1,z_1) \times rot_2^* \qquad (47).$$

The first image data record is reconstructed in the first coordinate system $G_1$, as a result of which a first 3D voxel data record $vol_1$ emerges, while the second image data record is reconstructed in the second coordinate system $G_2$, as a result of which a second 3D voxel data record $vol_2$ emerges:

$$vol_1 = R_{rot1}(input_1) \qquad (48),$$

$$vol_2 = R_{rot2}(input_2) \qquad (49),$$

where $R_{rotx}$ represents the reconstruction step and the inverse rotation rotx.

A first advantage of the above-described procedure is that the two resultant volume data records $vol_1$ and $vol_2$ are inherently aligned and the only difference between the values of the mutually corresponding voxels of the first volume and of the second volume is either noise or an artefact.

A second advantage is that, compared to conventional artefact reduction methods, only a single interpolation step accompanies the above-described procedure, and so the method according to the invention is superior to the conventional methods in respect of speed and quality.

Figure 6:
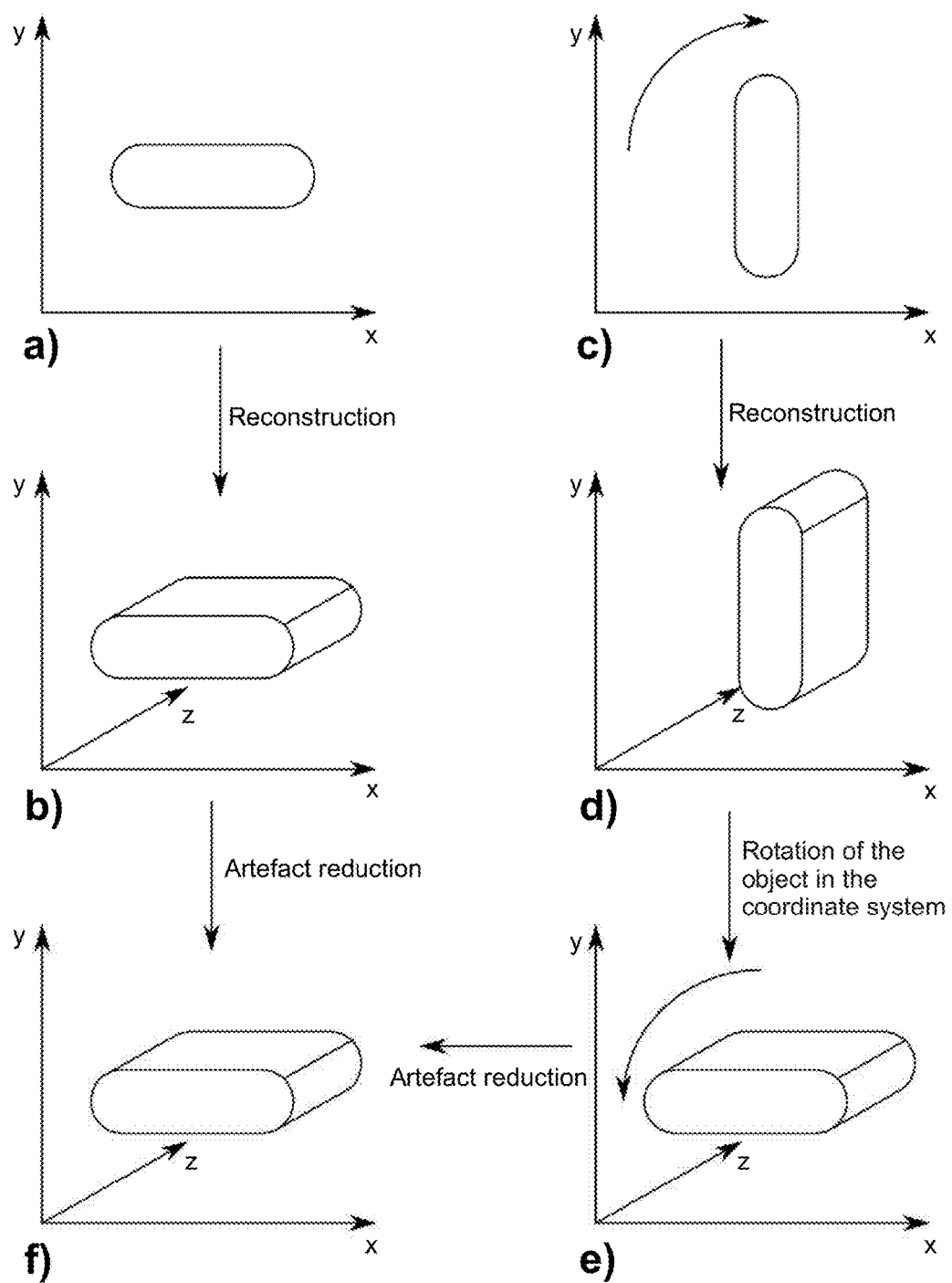
FIG. 6 shows schematic sketches for artefact reduction in accordance with one example, in which two interpolation steps are necessary.
Figure 7:
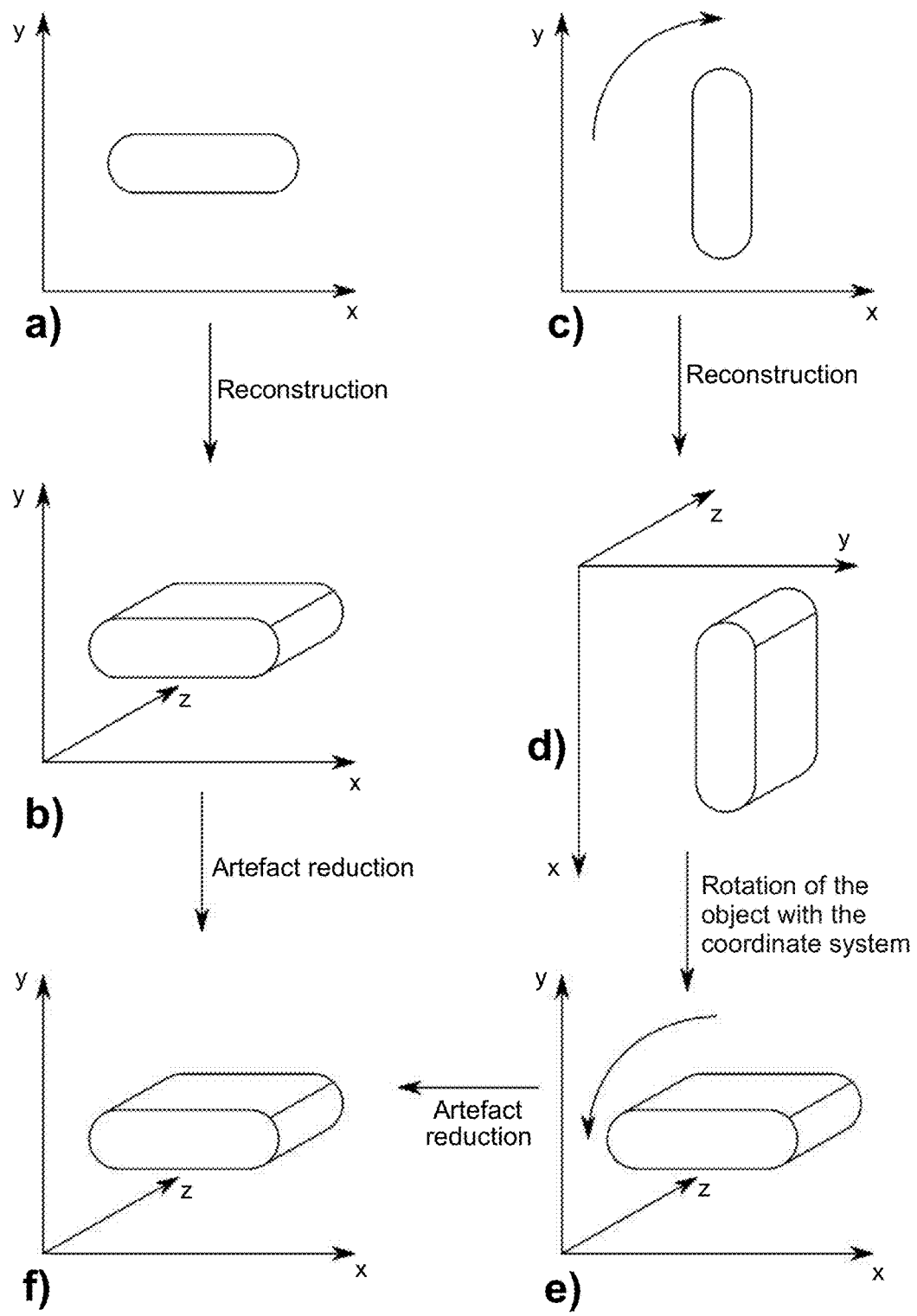
FIG. 7 shows schematic sketches for the artefact reduction according to the invention in accordance with a preferred embodiment, in which only one interpolation step is required.

The second advantage of the method according to the invention emerges, in particular, from the fact that, according to the invention, the reconstruction of the second image data record is carried out in a second coordinate system which is generated by rotating the first coordinate system or the basis coordinate system on the basis of the orientation of the tilted object prior to the reconstruction. In other words, the tilt of the object is already taken into account prior to the reconstruction of the second image data record. As a result, it is possible to save an interpolation step. This will now be explained in slightly more detail on the basis of FIGS. 6 and 7:

While FIG. 6 shows schematic sketches for artefact reduction in accordance with an example in which two interpolation steps are required, FIG. 7 shows schematic sketches for the artefact reduction according to the invention, in which, advantageously, only one interpolation step is required.

Images a to c of FIGS. 6 and 7 are identical. Here, Image a shows the object to be examined in a first orientation. A first image data record is generated in this orientation by acquiring first CT images. The object is reconstructed in a first coordinate system on the basis of this first image data record, as depicted in Image b. Image c shows the object in a second orientation, namely tilted by 90° about the z-axis. A second image data record is generated in this orientation by acquiring second CT images. FIGS. 6 and 7 differ in terms of the procedure which now follows. While the reconstruction of the second image data record is carried out in the same coordinate system in which the first image data record was also reconstructed in FIG. 6 (see FIG. 6d), the coordinate system is rotated in accordance with the tilt of the object prior to the reconstruction of the second image data record in FIG. 7. The reconstruction of the second image data record therefore takes place in a rotated or in a second coordinate system in FIG. 7. So that the reconstructed image data can be fused to one another, the coordinate system in which the second image data record was reconstructed must be aligned with the coordinate system in which the first image data record was reconstructed in accordance with the respective orientation of the object such that the coordinates in each case reproduce the same points in the object. In the case of the procedure in accordance with FIG. 6, the object needs to be rotated in the coordinate system to this end (see FIG. 6e), while the object is rotated with the coordinate system in the procedure in accordance with FIG. 7, which therefore requires no further real calculation (see FIG. 7e). Finally, FIGS. 6f and 7f indicate the data fusion of the reconstructed first image data record and second image data record.

The substantial difference between the procedure in accordance with FIG. 6 and the procedure according to the invention in accordance with FIG. 7 is that, for the second volume, two interpolation steps, namely from Image 6c to Image 6d and from Image 6d to Image 6e, are required in FIG. 6, while only one interpolation step, namely from Image 7c to Image 7d, accompanies the procedure in FIG. 7, i.e. the procedure according to the invention. In FIG. 7, the step from Image 7d to Image 7e does not contain computational operations since the coordinate system is rotated together with the data. The second interpolation step was advantageously avoided by virtue of the rotation already being integrated into the reconstruction.

Data Fusion:

The reconstructed volume data records $vol_1$ and $vol_2$ were inherently aligned by means of the modified filtered back projection, i.e. the voxel data in the two volume data records, which correspond to a specific (x,y,z), represent the same point or region of the object to be examined. All differences between mutually corresponding voxel data in the two volume data records can therefore be identified as artefacts. Therefore, the following applies:

$$vol_1(x,y,z) \approx vol_2(x,y,z) \quad (50),$$

and $$vol_1(x,y,z) - vol_2(x,y,z) = \Delta vol \quad (51),$$

where $\Delta vol$ represents the artefacts. As a result of the different orientations in which the object was scanned, the metallic artefact streaks in the two reconstructed volume data records $vol_1$ and $vol_2$ are not situated at the same positions. The orthogonal orientations minimize the possibility of overlapping metallic artefact streaks of the same object in $vol_1$ and $vol_2$.

The inventors found out that the artefacts bring about a positive or negative deviation in the intensities from the actual or real value. Hence, a minimum data fusion algorithm or a maximum data fusion algorithm is advantageous. To this end, the smallest or largest intensity value is used for the resultant or fused voxel data record of two mutually corresponding voxels of the first reconstructed image data record and the second reconstructed image data record (see also Equations 8a and 8b):

$$vol_f(x,y,z) = \min\{vol_1(x,y,z), vol_2(x,y,z)\} \quad (52a),$$

or $$vol_f(x,y,z) = \max\{vol_1(x,y,z), vol_2(x,y,z)\} \quad (52b).$$

The procedure in accordance with a preferred embodiment can therefore be summarized as follows:

calculating the filtered back projection of $input_1$ using $rot_1 = 1$ as a rotation (identity rotation):

$$vol_1 := P_{rot1}^{TF}(input_1) \quad (53);$$

calculating the filtered back projection of $input_2$ using $rot_2$ as a rotation:

$$vol_2 := P_{rot2}^{TF}(input_2) \quad (54);$$

calculating the minimum or maximum of $vol_1$ and $vol_2$:

$$vol_f(x,y,z) = \min\{vol_1(x,y,z), vol_2(x,y,z)\} \quad (55a),$$

or $$vol_f(x,y,z) = \max\{vol_1(x,y,z), vol_2(x,y,z)\} \quad (55b),$$

or

FIGS. 8 to 11 elucidate exemplary results of the artefact reduction of the method according to the invention. For the purposes of verifying the effectiveness of the method according to the invention, a printed circuit board with dimensions of 2.5 cm×2.5 cm was used as a test object. The printed circuit board is a multi-layer board with six metal layers. Conventionally reconstructed 3D voxel data records, which are based on CT scans of such a printed circuit board, generally have streak-like or strip-like artefacts along metallic tracks, which make an accurate detection of the track dimensions or of faults in the printed circuit board more difficult or prevent this. Therefore, such a printed circuit board is readily suitable as a test object. The method according to the invention was tested both using synthetically generated voxel data records and physically generated x-ray computed tomography data.

Figure 8:
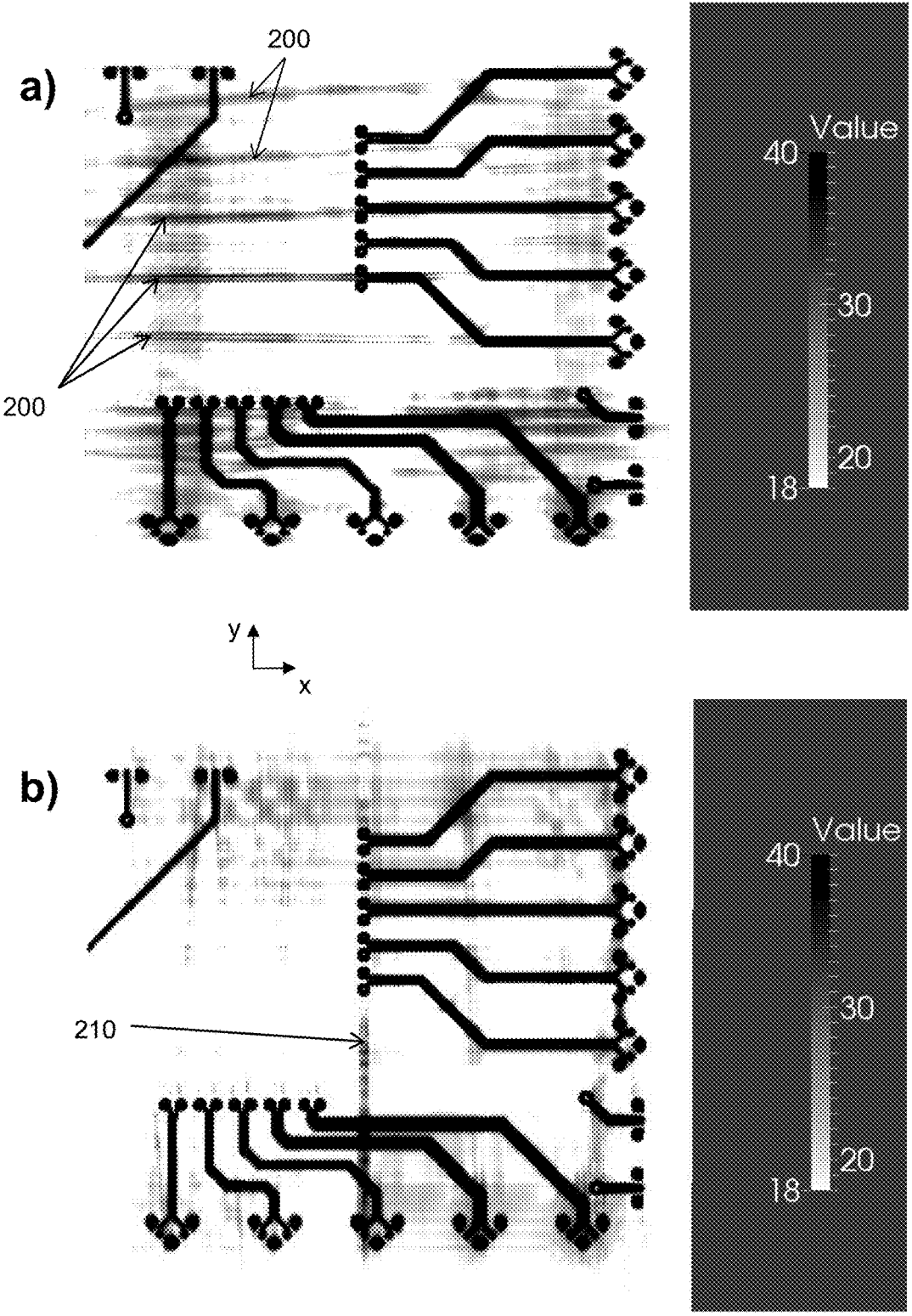
FIG. 8 shows photographic recordings of sectional images through synthetic 3D data of a test object, wherein the data of the image a) and the data of the image b) differ by a 90° tilt of the object when generating the CT image data record.

FIG. 8 shows photographic recordings of sectional images through synthetic 3D data of the test object, with the data of image a) and the data of image b) differing by a 90° tilt of the object when the CT image data record are generated. The synthetic 3D data were obtained on the basis of the production data of the printed circuit board. The coordinate system was selected in such a way that the printed circuit board is oriented parallel to the xy-plane. The synthetic data record of the test object is denoted by $O^S$.

Initially, a forward projection of the synthetic data with the quaternion orientation $rot_1 = 1$ (i.e. no rotation) was carried out in order to obtain the projection images $P_{rot1}(O^S)$. These were then reconstructed in a first grid $G_1$ (base grid) by means of filtered back projection, as result of which the volume $vol_1^S$ was obtained. A slice through the xy-plane of $vol_1^S$ is shown in FIG. 8A. It is visible that the artefacts 200 of the metal tracks on the printed circuit board extend in the horizontal direction, i.e. in the x-direction.

In a next step, $O^S$ was rotated or tilted by 90° along the z-axis by means of the quaternion $rot_2$ (see Equation 33) in order to obtain $O_{rot2}^S$. A second forward projection on the basis of $O_{rot2}^S$ was carried out in order to obtain $P_{rot2}(O^S)$. Prior to the reconstruction of these projection images, the second coordinate system $G_2$, in which the back projection is undertaken, was generated by rotating $G_1$ through $rot_2$ in accordance with Equation (47). As a result of this rotation, the reconstructed volume $vol_2^S$ was inherently aligned with the reconstructed volume $vol_1^S$. A slice through the xy-plane of $vol_2^S$ is depicted in FIG. 8b. It is visible that, in $vol_2^S$, the position and direction of the artefact streaks 210 and completely different to in $vol_1^S$ (FIG. 8a). In $vol_2^S$, the artefacts 210 do not extend in the horizontal direction as in $vol_1^S$, but in the vertical direction, i.e. in the y-direction.

Figure 9:
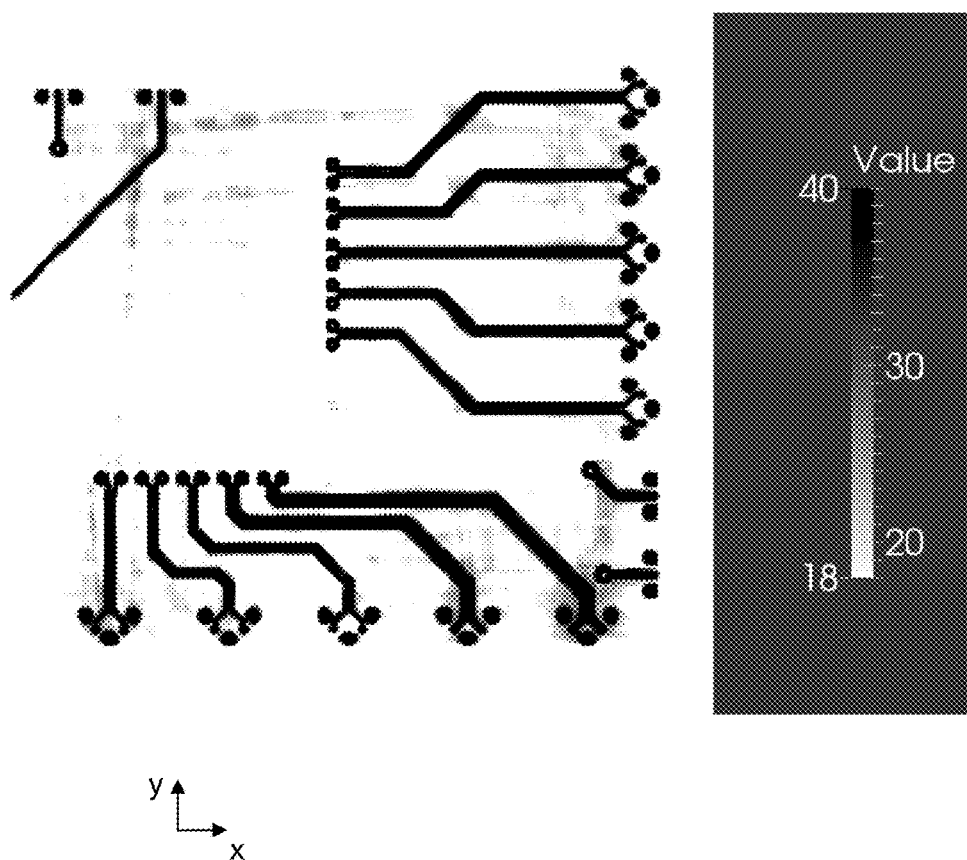
FIG. 9 shows a photographic record of a sectional image through synthetic 3D data of the test object of FIG. 8 with reduced artefacts after application of the method according to the invention.

Finally, the volume data records $vol_1^S$ and $vol_2^S$ were fused by forming the minimum, like in the "Data Fusion" section above. A slice through the xy-plane of the volume data record $vol_f^S$ are resulting therefrom is shown in FIG. 9. It is visible that the artefacts in $vol_f^S$ are significantly reduced compared with $vol_1^S$ and $vol_2^S$ (see FIG. 8).

The method according to the invention was also tested on the basis of physically recorded x-ray computed tomography images. To this end, the test object was successively scanned under two orthogonal object orientations. For both scans, images were recorded at 800 different acquisition angles in each case, with the resultant voxel dimensions being 35 µm×35 µm×35 µm.

In the first scan, the printed circuit board was arranged in the CT scanner in such a way that it was aligned parallel to the flat panel detector and therefore had the orientation $rot_1$. Projection images were recorded in this orientation, as a result of which $input_1$ was obtained. In the second scan, the printed circuit board was rotated or tilted by 90° along an axis oriented perpendicular to the flat panel detector, which axis intersects the x-ray source, in accordance with the orientation $rot_2$ in Equation 33. The projection data record obtained thereby is denoted by $input_2$.

While $input_1$ was reconstructed by means of filtered back projection in the first grid $G_1$ in order to obtain $vol_1$, $input_2$ was reconstructed by means of filtered back projection in a grid $G_2$ rotated in relation to the first grid $G_1$ by $rot_2$ in order to obtain $vol_2$. Corresponding slices through the xy-plane of $vol_1$ and $vol_2$ are shown in FIGS. 10a and 10b in each case.

It is visible that both data records represent the same layer of the printed circuit board and that, consequently, $vol_1$ and $vol_2$ are inherently aligned.

Like in the case of the synthetic data, which are presented in FIG. 8, there is a difference in the position and alignment of the artefact streaks 200 for $vol_1$ and 210 for $vol_2$ in FIGS. 10a and 10b as a result of the different object orientations when recording the data. Both volume data records $vol_1$ and $vol_2$ were fused using a maximum algorithm.

A corresponding slice through the xy-plane of the fused volume data record $vol_f$ is shown in FIG. 11. Here, it is once again visible that the artefacts could be significantly reduced. There are only still small regions in $vol_f$ in which artefacts are still present, as can be identified e.g. in the central left-hand and central upper regions of FIG. 11. However, this can be traced back to inaccuracies when tilting the object by 90° since the tilt was carried out manually in the experiments presented here.

TABLE 1

List of Reference Signs with Descriptors

| Reference Numeral | Description |
|---|---|
| 1 | Acquisition of CT images under different perspectives by means of CT |
| 2 | Image sequence |
| 3 | CT reconstruction/unfiltered or filtered back projection/MLEM |
| 4 | Voxel or volume data record |
| 5 | Further processing |
| 6 | Projection |
| 10 | First image data record |
| 20 | Second image data record |
| 30 | Image data reconstruction algorithm |
| 40 | Artefact-reduced 3D voxel or volume data record |
| 50 | X-ray source |
| 60 | Object support |
| 70 | Detector/flat panel detector |
| 80 | Object (e.g. printed circuit board) |
| 100 | Provision of the first image data record and the second image data record |
| 101 | Initial value (e.g. 1) |
| 102 | Input data record |
| 103 | Output or results volume data record |
| 104 | Input data record divided by projection/image sequence ratio |
| 105 | Projection |
| 106 | Transposed projection |
| 107 | Transposed projection |
| 108 | Back projection |
| 109 | Normalization volume |
| 110 | Back projection divided by normalization volume/volume ratio |
| 112 | Output or results data record of the (n + 1)-th iteration step |
| 200 | Artefacts/horizontal artefact streaks |
| 210 | Artefacts/vertical artefact streaks |

We claim:

1. A method for generating an artefact-reduced voxel data record of an object, the method comprising:
   generating, by a computing device, a first image data record by acquiring a multiplicity of first computed tomography images of the object, wherein an acquisition angle in respect of a first axis of rotation is modified between the acquisition of the first computed tomography images;
   tilting the object by a predetermined tilt angle in respect of a second axis of rotation, wherein the second axis of rotation is arranged substantially orthogonal to the first axis of rotation;
   generating, by the computing device, a second image data record by acquiring a multiplicity of second computed tomography images of the object tilted about the second axis of rotation;
   utilizing an iterative image data reconstruction algorithm to generate the artefact-reduced voxel data record of the object based on the generated first image data record and the generated second image data record, wherein the image data reconstruction algorithm comprises a calculation of a projection associated with the first image data record and a projection associated with the second image data record, and wherein the calculation of the projection associated with the second image data record comprises a coordinate transform on the basis of an orientation of the tilted object;
   dividing each pixel of the generated first image data record by the corresponding pixel of the projection associated with the first image data record;
   obtaining a modulated projection associated with the first image data record;
   dividing each pixel of the generated second image data record by the corresponding pixel of the projection associated with the second image data record, and
   obtaining a modulated projection associated with the second image data record.

2. The method according to claim 1, wherein the image data reconstruction algorithm is based on a maximum likelihood expectation maximization algorithm.

3. The method according to claim 1, wherein the image data reconstruction algorithm comprises a calculation of a normalization volume data record as a sum of a normalization volume data record associated with the first image data record, and a normalization volume data record associated with the second image data record.

4. The method according to claim 1, further comprising:
   calculating a back projection based on the modulated projection associated with the first image data record and the modulated projection associated with the second image data record.

5. The method according to claim 4, wherein the back projection is calculated as a sum of a first back projection associated with the first image data record and a first back projection associated with the second image data record.

6. A method for generating an artefact-reduced voxel data record of an object, the method comprising:
generating, by a computing device, a first image data record by acquiring a multiplicity of first computed tomography images of the object, wherein an acquisition angle in respect of a first axis of rotation is modified between the acquisition of the first computed tomography images of the object;
tilting the object by a predetermined tilt angle in respect of a second axis of rotation, wherein the second axis of rotation is arranged substantially orthogonal to the first axis of rotation;
generating, by the computing device, a second image data record by acquiring a multiplicity of second computed tomography images of the object tilted about the second axis of rotation;
reconstructing the first image data record in a first coordinate system;
generating a second coordinate system by rotating the first coordinate system on the basis of an orientation of the tilted object, wherein the second coordinate system is generated from the first coordinate system by performing the following transformation:

$$G_2(0,x_2,y_2,z_2) = rot_2 \times G_1(0,x_2,y_2,z_2) \times rot_2^*,$$

where $G_1$ denotes the first coordinate system, $G_2$ denotes the second coordinate system, $rot_2$ denotes a rotation quaternion and $rot_2^*$ denotes the rotation quaternion conjugate to $rot_2$;
reconstructing the second image data record in the second coordinate system; and
generating, by the computing device, the voxel data record of the object based on data fusion of the reconstructed first image data record and the reconstructed second image data record.

7. The method according to claim 6, wherein the reconstruction of at least one of the first image data record and the second image data record is based on a back projection.

8. The method according to claim 7, wherein the back projection comprises a rotation of voxel coordinates.

9. The method according to claim 6, wherein the data fusion of the reconstructed first image data record and the reconstructed second image data record comprises an extremal value formation of mutually corresponding voxels of the first reconstructed image data record and the second reconstructed image data record.

10. A non-transitory computer program product storing machine-readable program code that, when executed, causes a computer at least to perform:
generating a first image data record by acquiring a multiplicity of first computed tomography images of an object, wherein an acquisition angle in respect of a first axis of rotation is modified between the acquisition of the first computed tomography images;
tilting the object by a predetermined tilt angle in respect of a second axis of rotation, wherein the second axis of rotation is arranged substantially orthogonal to the first axis of rotation;
generating a second image data record by acquiring a multiplicity of second computed tomography images of the object tilted about the second axis of rotation;
utilizing an iterative image data reconstruction algorithm to generate an artefact-reduced voxel data record of the object based on the generated first image data record and the generated second image data record, wherein the image data reconstruction algorithm comprises a calculation of a projection associated with the first image data record and a projection associated with the second image data record, and wherein the calculation of the projection associated with the second image data record comprises a coordinate transform on the basis of an orientation of the tilted object;
dividing each pixel of the generated first image data record by the corresponding pixel of the projection associated with the first image data record;
obtaining a modulated projection associated with the first image data record;
dividing each pixel of the generated second image data record by the corresponding pixel of the projection associated with the second image data record; and
obtaining a modulated projection associated with the second image data record.

11. The non-transitory computer program product recited in claim 10, wherein the image data reconstruction algorithm is based on a maximum likelihood expectation maximization algorithm.

12. The non-transitory computer program product recited in claim 10, wherein the image data reconstruction algorithm comprises:
a calculation of a normalization volume data record as a sum of a normalization volume data record associated with the first image data record; and
a normalization volume data record associated with the second image data record.

13. The non-transitory computer program product recited in claim 10, wherein the image data reconstruction algorithm comprises a calculation of a projection associated with the first image data record and a projection associated with the second image data record, and wherein the calculation of the projection associated with the second image data record comprises a coordinate transform on the basis of an orientation of the tilted object.

14. The non-transitory computer program product recited in claim 13, wherein the machine-readable program code, when executed, further causes the computer to:
divide each pixel of the generated first image data record by the corresponding pixel of the projection associated with the first image data record;
obtain a modulated projection associated with the first image data record;
divide each pixel of the generated second image data record by the corresponding pixel of the projection associated with the second image data record; and
obtain a modulated projection associated with the second image data record.

15. The non-transitory computer program product recited in claim 14, wherein the machine-readable program code, when executed, further causes the computer to:
calculate a back projection based on the modulated projection associated with the first image data record and the modulated projection associated with the second image data record.

16. The non-transitory computer program product recited in claim 15, wherein the back projection is calculated as a sum of a first back projection associated with the first image data record and a first back projection associated with the second image data record.

17. A non-transitory computer program product storing machine-readable program code that, when executed, causes the computer to:
generate a first image data record by acquiring a multiplicity of first computed tomography images of an object, wherein an acquisition angle in respect of a first axis of rotation is modified between the acquisition of the first computed tomography images of the object;

tilt the object by a predetermined tilt angle in respect of a second axis of rotation, wherein the second axis of rotation is arranged substantially orthogonal to the first axis of rotation;

generate a second image data record by acquiring a multiplicity of second computed tomography images of the object tilted about the second axis of rotation;

reconstruct the first image data record in a first coordinate system;

generate a second coordinate system by rotating the first coordinate system on the basis of an orientation of the tilted object, wherein the second coordinate system is generated from the first coordinate system by performing the following transformation:

$$G_2(0,x_2,y_2,z_2) = \text{rot}_2 \times G_1(0,x_2,y_2,z_2) \times \text{rot}_2^*,$$

where $G_1$ denotes the first coordinate system, $G_2$ denotes the second coordinate system $\text{rot}_2$ denotes a rotation quaternion and $\text{rot}_2^*$ denotes the rotation quaternion conjugate to $\text{rot}_2$;

reconstruct the second image data record in the second coordinate system; and generate an artefact-reduced voxel data record of the object based on data fusion of the reconstructed first image data record and the reconstructed second image data record.

* * * * *